Jan. 10, 1950 T. KONISKEY 2,493,879
ATTACHMENT FOR WHEELS
Filed Nov. 12, 1948

Inventor
Ted Koniskey
By Clarence A. O'Brien
and Harvey B. Jacobson
Attorneys

Patented Jan. 10, 1950

2,493,879

UNITED STATES PATENT OFFICE 2,493,879

ATTACHMENT FOR WHEELS

Ted Koniskey, Bayfield, Wis.

Application November 12, 1948, Serial No. 59,515

4 Claims. (Cl. 152—405)

This invention relates to a vehicle wheel, but is more particularly directed to an improved rim construction whereby the tire of the wheel may be more easily and expeditiously positioned on or removed from the wheel.

The primary object of this invention is to provide a construction wherein the tire retaining ring of the rim is made quickly and easily detachable from the permanent portion of the wheel through the cooperation of the pin and slot connection positioned in spaced intervals circumferentially of the ring and adapted to be locked in engaged condition.

Yet another object of this invention is to provide a rim construction of two complementary parts which may be readily and easily attached and detached from each other to admit the ready and easy removal of the rims from the wheel and the tires from the rim in a matter of a few minutes at the most.

A further object of this invention is to provide in a wheel, a discerptible tire supporting attachment comprising a first rim and a second rim, means for retaining said first rim on said second rim, and latch means for releasably locking said retaining means.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 2:
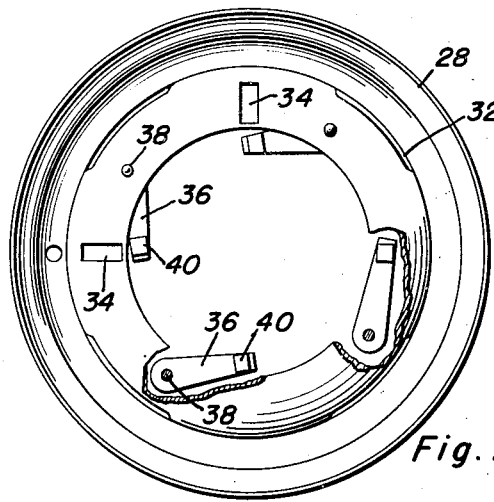
Figure 2 is a top plan view, parts broken away, of one of the rim members.

Indicated generally at 10 is a metallic, substantially circular rim having peripheral ridges 12 for supporting a tire thereon. The rim number 10 is further provided with upstanding, circumferentially spaced elongated shoulders 14 and further provided with circumferentially spaced apertures 16. Extending through each of the apertures is a hook latch member 18 which at the end opposite the hook is pivoted as at 20 to the undersurface of the rim member 10. A pair of lock nuts 22 are carried at the end of the hook member 18 for securing the pivot pin 20 in proper position. The rim member 10 is further provided with a plate 24 at the center thereof which is provided with circumferentially spaced apertures 26 for receiving the hub bolts (not shown) of the wheel. Thus it will be seen that it is this rim member 10 which is first positioned upon the wheel. The deep channel of the rim may be provided with a rubber ring or band 27 to protect the inner tube (not shown) from pinching or chafing.

Figure 4:
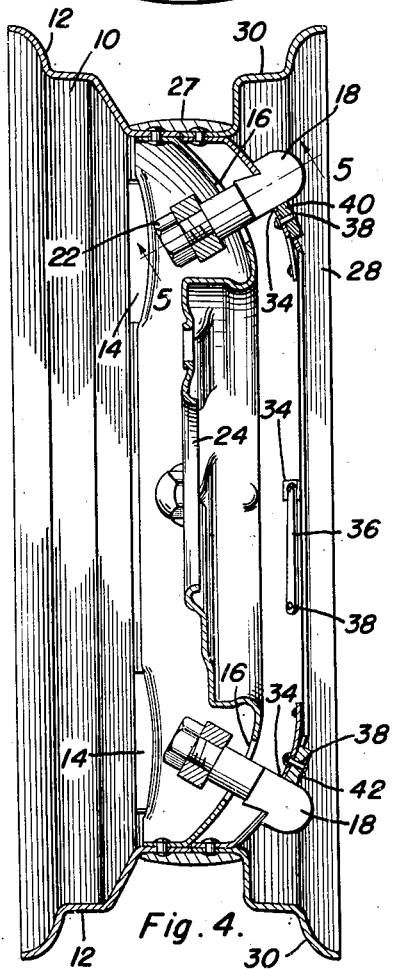
Figure 4 is a sectional view taken substantially in the plane of section line 4—4 of Figure 1.
Figure 1:
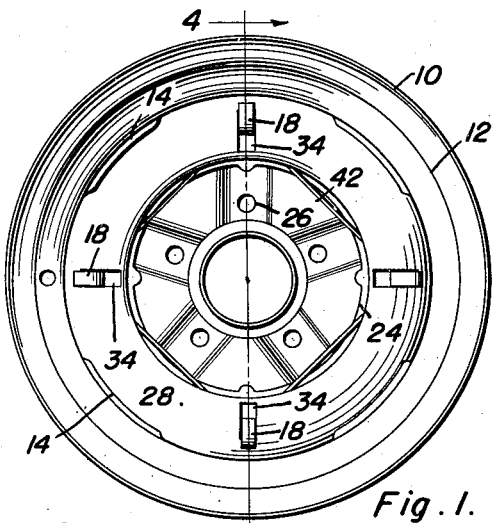
Figure 1 is a top plan view of the assembled rim construction of the instant invention.
Figure 5:
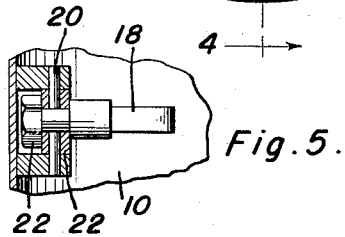
Figure 5 is a sectional view taken substantially in the plane of section line 5—5 of Figure 4.

As shown clearly in Figures 2 and 4, a second complementary rim member 28 is provided which also has peripheral ridges 30 which cooperate with the peripheral ridges 12 of the rim member 10 to produce a substantially channel shaped frame for the retention of a tire (not shown) thereon. The rim member 28 is further provided with circumferentially spaced elongated slots 32 which receive the shoulders 14 of the rim member 10. Circumferentially about the inner portion of the rim member 28 is a plurality of substantially rectangular apertures 34 through which the hook members 18 extend.

To lock the hook members 18 securely within the circumferentially spaced apertures 34, the following means is provided. Arms 36 are pivoted to the rim member 28 as at 38 adjacent each of the elongated slots 32. The free end of each arm 36 is provided with an upstanding detent 40 and it will be understood that the arm 36 is somewhat flexible. Thus, as the arm 36 is slightly bent and inwardly pivoted the detent 40 will slip into one of the apertures 34 behind and abutting the hook member 18 to retain the member 18 in locked position in the aperture 34.

Figure 3:
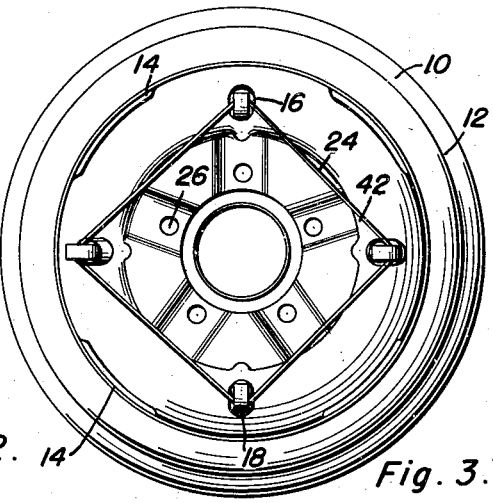
Figure 3 is a top plan view of the complementary rim member.

In practical operation, the rim member 10 is positioned on the wheel by placing the apertures 26 about the hub bolts of the wheel. The second rim member 28 is positioned on the member 10 by fitting the elongated slots 32 about the shoulders 14 and by slipping the hooked member 18 into the rectangular apertures 34. Thereafter, the arms 36 are pivoted so that the detents 40 engage the apertures 34 behind the hook members 18 to lock the latter therein. To remove the rim member 28 from the member 10, the detents 40 are depressed by a prong or screw driver through the apertures 34 and then the arms 36 are pivoted to remove the detents from the apertures. The hooked members 18 are pivoted upwardly and the rim 28 is removed from the rim 10. To maintain the hooked members 18 in an upright position so that they can easily clear the apertures 34, a webbing 42, such as a cord or rubber hose, is entrained about the hook members as shown in Figure 3.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a wheel, a discerptible tire supporting attachment comprising a first rim and a second rim, means for retaining said first rim on said second rim, and latch means for releasably locking said retaining means, said retaining means including spaced shoulders on said first rim, spaced slots in said second rim for receiving said shoulders, spaced apertures in said first rim and hooked catches pivoted on said second rim engageably received in said apertures.

2. The combination of claim 1 wherein said latch means includes resilient fingers pivoted to said first rim and detents on the free ends of said fingers receivable in said apertures adapted to abut said hooked catches and keep the latter in locked engagement on said first rim.

3. The combination of claim 2 and means for retaining said hooked catches in a fixed vertical position when separating said first and second rims.

4. The combination of claim 3 wherein said last-named means includes a flexible member entrained about said hooked catches.

TED KONISKEY.

REFERENCES CITED

The following references are of record in the file of this patent:

UNITED STATES PATENTS

| Number | Name | Date |
| --- | --- | --- |
| 1,989,189 | Frank | Jan. 29, 1935 |
| 2,384,649 | Sinclair | Sept. 11, 1945 |